United States Patent [19]

Halasa et al.

[11] 3,856,768

[45] Dec. 24, 1974

[54] SODIUM OR POTASSIUM HYDROCARBON COMPOUND AND A CROWN ETHER AS A CATALYST COMPOSITION FOR POLYMERIZATION OF CONJUGATED DIENES

[75] Inventors: Adel F. Halasa, Bath; Tai Chun Cheng, Akron, both of Ohio

[73] Assignee: The Firestone Tire & Rubber Company, Akron, Ohio

[22] Filed: Feb. 26, 1973

[21] Appl. No.: 335,962

[52] U.S. Cl. ......... 260/94.2 M, 260/82.1, 260/83.7, 260/92.3, 260/93.5 R
[51] Int. Cl. ............................................... C08d 3/06
[58] Field of Search ............ 260/94.2 M, 82.1, 83.7

[56] References Cited
UNITED STATES PATENTS

| | | |
|---|---|---|
| 3,288,872 | 11/1966 | House ................................ 260/669 |
| 3,306,949 | 2/1967 | Mertzweiller et al. ..... 260/94.2 M X |
| 3,352,934 | 11/1967 | House et al. ............... 260/94.2 M X |

*Primary Examiner*—Joseph L. Schofer
*Assistant Examiner*—Maria S. Tungol

[57] ABSTRACT

Conjugated dienes are polymerized in hydrocarbon solution by a new catalyst system which gives polymer products of desirable properties. This catalyst system comprises: (1) a sodium or potassium alkyl having 1-10 carbon atoms in which the hydrocarbon portion is a primary, secondary or tertiary alkyl radical, and (2) a crown ether as defined more fully hereinafter. The polymer products are particularly useful in tire compositions.

17 Claims, No Drawings

SODIUM OR POTASSIUM HYDROCARBON COMPOUND AND A CROWN ETHER AS A CATALYST COMPOSITION FOR POLYMERIZATION OF CONJUGATED DIENES

BACKGROUND OF THE INVENTION

1. Field of the Invention

This invention relates to a process for the polymerization of conjugated dienes using a catalyst composition comprising a sodium or potassium hydrocarbon compound and a crown ether.

2. Related Prior Art

The polymerization of conjugated dienes has been effected in a variety of methods. However there are various disadvantages or deficiencies in various methods presently known including undesirable or uncontrollable properties in the products.

Lithium hydrocarbon compounds have been used to catalyze the polymerization of dienes with the polymerization generally conducted in hydrocarbon solvents.

Ethers such as tetrahydrofuran, diethyl ether, diglyme, dioxane, etc., have been used in combination with the lithium hydrocarbon to give higher proportions of 1,2 configuration in the resultant polymer structures as well as other desirable properties. However when sodium and potassium hydrocarbon compounds are used with such ethers, the ethers are cleaved by the sodium or potassium compound with the result that the polymers produced are of low molecular weight and very poor yields are obtained.

STATEMENT OF THE INVENTION

In accordance with the present invention, it has now been found that sodium and potassium hydrocarbon compounds can form complexes with high molecular weight cyclic ethers, known as "crown ethers" as described more fully hereinafter, and such complexes can be used to catalyze the polymerization of conjugated dienes in a hydrocarbon solvent to give high molecular weight polymers having 65–85, preferably 70–75 percent 1,2 configuration with high conversion to polymers having a broader molecular weight distribution than generally obtained with accompanying improved process-ability, and capable of being used in tire compositions to give good wet traction properties, good wearability, etc.

In contrast to the ether cleavage effected by the sodium and potassium compounds with smaller ethers, it is found that the complexes formed by sodium and potassium alkyl compounds with crown ethers are very stable and are particularly useful for diene polymerizations conducted in hydrocarbon solvents. The crown ether may be added to the hydrocarbon solvent prior to or after the addition of the sodium or potassium hydrocarbon.

It is also found that the catalyst of this invention gives much higher molecular weight polymers than obtained with Li alkyl. For example, the crown ether - Na or K alkyl catalysts give DSV's of 2–10 whereas Li alkyl in THF generally gives no higher than about 1 DSV.

It is found that a much smaller proportion of crown ether to metal alkyl needs to be used. For example, it is generally necessary to use about 30 millimoles of tetrahydrofuran per millimole of lithium alkyl whereas less than 0.1 and even as little as 0.01 millimole of crown ether per millimole of Na or K alkyl is satisfactory in the present invention. Moreover, with Li alkyl and the small ethers, temperatures higher than 60° C. must be avoided to prevent cleavage of the ether by the Li alkyl, whereas temperatures as high as 150° C. may be used in the present invention.

The sodium or potassium hydrocarbon compound is used in a proportion of 1–10 millimoles, preferably 2–7 millimoles per 100 grams of monomer. The crown ether is used in a ratio of 0.01–1.0, preferably 0.015–0.5 millimoles per millimole of sodium or potassium hydrocarbon.

The crown ethers can have various structures, but are characterized by the fact that they have a heterocyclic ring in which there are at least three, preferably at least four oxygen atoms in the heterocyclic structure connected by aliphatic or aromatic divalent hydrocarbon groups, and in each heterocyclic ring there are at least 6, preferably at least 8 carbon atoms, there being at least 2 carbon atoms per oxygen atom and there being no particular advantage in having more than a total of 60 atoms in the heterocyclic structure of the crown ether. Such structures are found to complex very easily with the sodium or potassium hydrocarbon compounds. When an aromatic or cycloaliphatic ring is present there is advantageously a pair of oxygen atoms attached to adjacent (or ortho) carbon atoms in such aromatic or cycloaliphatic ring.

Some of the oxygen atoms in such heterocyclic rings, preferably no more than 50 percent, may be replaced by amino nitrogen radicals or sulfur atoms, which also contribute complexing properties.

Typical crown ethers suitable for the practice of this invention are described in SCIENCE, Volume 174, No. 4,008, Oct. 29, 1971, Pages 459–467 and Angew, Catm. International Addition, Volume 1, 1972, No. 1, Pages 16–25. While some of the structures and descriptions will be included herein, the details and scope of the disclosures of structures in compounds of these two articles are incorporated herein by reference.

The macrocyclic polyethers ("crown compounds") can be assigned unique but very cumbersome names by application of the IUPAC rules for bridged hydrocarbons (rules A–31 and A–32). The rules for fused polycyclic compounds (A–21 to A–23) likewise give unequivocal but most complicated names. A system of names was therefore devised solely for the ready identification of these compounds. The examples below illustrate how these names are made up of the side-ring substituents, the total number of atoms in the polyether ring, the "crown", and the number of oxygen atoms in the main ring. The "crown names" are simple but should only be used in conjunction with formulas since they are not unambiguous. Cyclohexane rings fused to the polyether ring as in compound (3c) may be termed "perhydrobenzene" but more commonly are called cyclohexyl.

Typical crown ethers that can be used as catalyst components in the process of this invention include those represented by the following structural formulas and identified by their specific "crown" names:

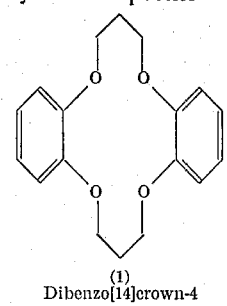

(1)
Dibenzo[14]crown-4

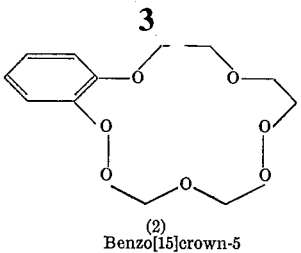

(2)
Benzo[15]crown-5

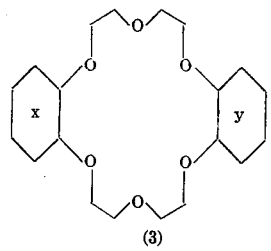

(3)

(3a), x=nil, y=nil    [18]Crown-6
(3b), x=$C_6H_4$, y=nil    Benzo[18]crown-6
(3c), x=$C_6H_{10}$, y=nil    Perhydrobenzo[18]crown-6
(3d) ≡(4a), x=$C_6H_4$, y=$C_6H_4$    Dibenzo[18]crown-6
(3e), x=$C_6H_{10}$, y=$C_6H_4$    Benzoperhydrobenzo[18]crown-6
(3f), x=$C_6H_{10}$, y=$C_6H_{10}$    Perhydrodibenzo[18]crown-6

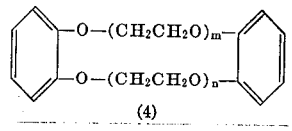

(4)

(4a)≡(3d), m=2, n=2    Dibenzo[18]crown-6
(4b), m=2, n=3    Dibenzo[21]crown-7
(4c), m=3, n=3    Dibenzo[24]crown-8
(4d), m=4, n=4    Dibenzo[30]crown-10
(4e), m=5, n=9    Dibenzo[48]crown-16
(4f), m=9, n=9    Dibenzo[60]crown-20

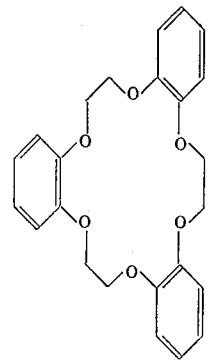

(5)
Tribenzo[18]crown-6

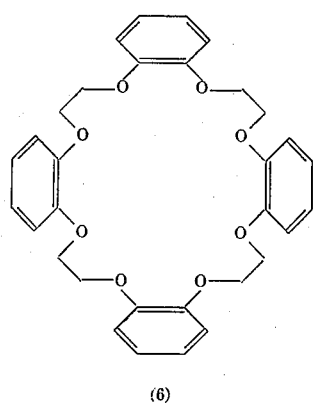

(6)
Tetrabenzo[24]crown-8

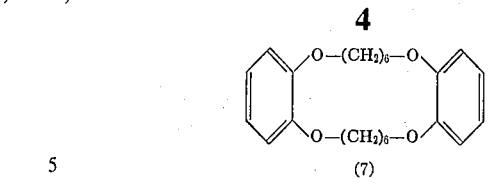

(7)
Dibenzo[20]crown-4

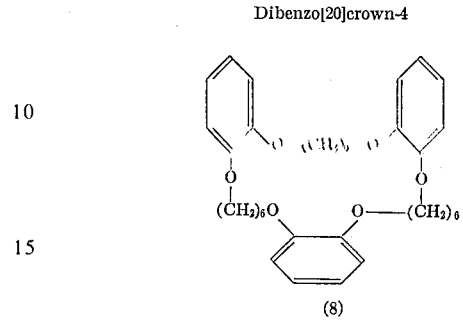

(8)
Tribenzo[30]crown-6

The aromatic crown polyethers are prepared by straight-forward condensation methods exemplified by the stoichiometric equations (1) to (3), in which Q and T represent divalent organic groups generally of the formula $-(CH_2CH_2O)_nCH_2CH_2-$.

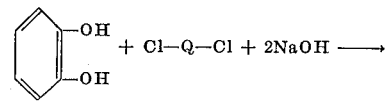

(1)

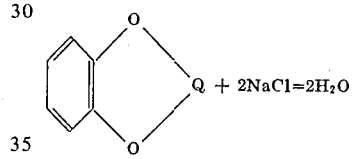

(2)

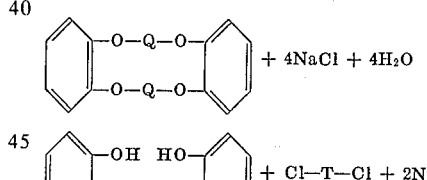

(3)

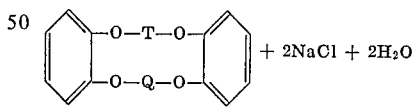

The condensations are typically run in 2-butanol under reflux for 12 to 24 hours. Method (1) can be used to prepare, for example, benzo[12]crown-4 (yield 4 percent). Method (2) gives, for instance, dibenzo-[18]crown-6. The starting material for method (3) is made by attaching a base-stable protecting group, e.g., benzyl or tetrahydropyranyl, to one of the hydroxyls of catechol; two moles of this compound are then condensed with Cl—Q—Cl, and the protecting group is subsequently removed. Eq. (3) is most convenient for synthesis of uneven-numbered polyether rings, e.g., dibenzo-[21]crown-7.

Aromatic macrocyclic polyethers containing neutral substituents, such as alkyl or chloro, may be prepared by using suitable substituted aromatic vicinal diols. Of course, the substituents must be inert toward sodium hydroxide and the open-chain dichloropolyether.

Saturated polyethers are prepared from the corresponding aromatic ones by catalytic hydrogenation, typically in 2-butanol at 100° C. and 7–10 atm. over a ruthenium catalyst. Recovery of the product is best done by column chromatography on alumina, and the yields are almost quantative.

Sodium and potassium alkyl compounds that can be used have 1–10, preferably 3–8 carbon atoms and include compounds in which the alkyl portion is methyl, ethyl, n-propyl, isopropyl, n-butyl, sec.-butyl, t-butyl, n-amyl, sec.-amyl, t-amyl, n-hexyl, sec.-hexyl, t-hexyl, n-octyl, 1,1,5-trimethyl-pentyl, n-decyl, 1-methyl-2,4-diethyl-pentyl, etc. Even though larger groups can be used, there is no particular advantage, and the sodium or potassium can be attached to a primary, secondary or tertiary carbon atom.

These can be prepared by the reaction of metallic sodium or potassium with the corresponding halohydrocarbon. In cases where it is desired to prepare the sodium or potassium alkyl free of the byproduct halide, this can be done by adding a solution of sodium or potassium alkoxide, such as NaO t-Bu in cyclohexane, to a hexane solution of halide-free alkyl lithium. The resultant Na or K alkyl precipitates and, after filtering, the solid Na or K alkyl is washed under nitrogen with hexane to remove any lithium residues.

In addition to monosodium or monopotassium alkyl compounds, hydrocarbons having two sodium or potassium atoms attached can also be used, such as butane-1,4-disodium, pentane-1,4-disodium, butane-1,4-dipotassium, etc. These compounds are prepared by the same methods as described above for preparing the monosodium of monopotassium compounds starting with dichlorohydrocarbon or dilithiohydrocarbon. However, these compounds are not as practical as the monosodium or monopotassium compounds and the latter are therefore preferred. Nevertheless, the use of the disodium and dipotassium hydrocarbon compounds are considered as coming within the scope of this invention.

Conjugated dienes that may be polymerized, either alone or with each other, in accordance with this invention include: 1,3-butadiene, isoprene, chloroprene, 2-phenyl-1,3-butadiene, piperylene, etc.

Although diene homopolymers, or copolymers of two or more dienes, particularly butadiene homopolymers are preferred in the practice of this invention, diene copolymers can also be used where the comonomers impart desirable properties and do not detract from the diene polymer properties. The comonomers can be olefins, such as butene-1, n-butene-2, isobutylene, n-pentene-1, n-pentene-2 and the like, and preferably are vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o—, m— and p—Cl—styrene, vinyl naphthalene, vinyl cyclohexyl naphthalene, vinyl methyl naphthalene, vinyl butyl naphthalene, isopropenyl naphthalene, isopropenyl isopropyl naphthalene, 1-vinyl-4-chloronapthalene, 1-isopropenyl-5-chloronaphthalene, vinyl diphenyl, vinyl diphenylethane, 4-vinyl-4'-methyl-diphenyl, 4-vinyl-4'-chlorodiphenyl, and the like. Preferably such comonomers have no more than 12 carbon atoms. Where such comonomers are to be used, generally at least 1 percent, preferably at least 5 percent by weight should be used and as much as 60 percent, preferably no more than 30 percent may be used.

The polymerization is preferably effected in the presence of an inert diluent to facilitate handling of the polymer and to give better temperature control. Liquid hydrocarbons are preferred for this purpose, such as benzene, toluene, cyclohexane, saturated aliphatic hydrocarbons preferably of the straight chain variety, such as n-hexane, n-heptane, etc. The concentration of monomer is not critical, but for practical purposes it is generally in the range of 10–80 percent by weight.

Polymers produced according to this invention have molecular weights of 25,000 to 1,000,000, generally 100,000 to 500,000. Yields of at least 75 percent and as high as 95–99 percent are easily produced. The 1,2 configuration in the polymer is generally in the range of 65–85 percent, most often 70–75 percent. It has been found that desirable wet traction or skid resistance properties result from such ranges of 1,2 configuration in the polymers.

The process should also be conducted under substantially anhydrous conditions. This is accomplished by using anhydrous reactants and dry reaction vessels and maintaining customary precautions during the reaction to keep moisture out of the reaction vessel. The reactants should also be free of impurities which react with the catalyst components. Such impurities may be tested for by titration with Michlers ketone according to procedures known in this art.

The process of this invention is advantageously conducted in a closed system wherein the loss of solvent or monomer by evaporation is reduced or avoided in addition to which air and moisture are excluded. As a convenience, the pressure at which the reaction is conducted may be the pressure created by the system, i.e., autogenous pressure. If desired, however, higher or lower pressures may be employed.

At the completion of the reaction, the mixture is treated with a proton donor to deactivate the metal compound and the polymer recovered. This is preferably accomplished by adding the crude reaction mixture to a large amount of alcohol or water and then recovering the polymer coagulate. This procedure not only deactivates but also removes the metal compound from the polymer.

The "dilute solution viscosity" (DSV) referred to herein is defined as the inherent viscosity determined at 25° C. on a 0.4 percent solution of the polymer in toluene. It is calculated by dividing the natural logarithm of the relative viscosity by the present concentration of the solution, i.e., it is the inherent viscosity measured at 0.4 percent concentration. The molecular weights reported herein are determined from these viscosities. High resolution nuclear magnetic resonance (NMR) spectra of the conjugated diene polymers are used to determine the polymer microstructure.

Where normal precautions are taken to exclude impurities from the polymerization system which will adversely affect the catalyst, the polymerization will proceed without detectable chain termination. Therefore the molecular weight may be increased to any desired value within the range indicated above by the presence of sufficient monomer to give that molecular weight on the basis of moles of Na or K hydrocarbon, and the conversion can be carried out to any desired degree, even up to 100 percent, by continuing the reaction for a sufficient period. Generally substantially complete conversion can be obtained in less than 16 hours, and in most cases less than 8 hours. For practical purposes it may be desirable to terminate the reaction prior to complete conversion, for example in the range of 75–95 percent and thereby for practical purposes reduce the reaction period.

Although variations of temperature within the range indicated above will generally not affect the type of polymer produced, an increase in temperature does increase the rate of polymerization. As stated above, the temperature range is advantageously −50–150° C. and preferably 30–80° C. At these temperatures, the reaction is advantageously conducted for 2–16 hours and at 6–8 hours in the preferred temperature range.

It is essential that air be excluded during the preparation of the potassium and sodium hydrocarbon components and that air is completely removed, if any is present, from the crown ether before it is complexed with the potassium or sodium hydrocarbon. Oxygen, nitrogen and other components of the air seriously inhibit the desired polymerization reaction and consequently should be excluded from the reaction zone. It is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during storage and during subsequent introduction into the reaction chamber. The catalyst may be produced in situ in the reaction vessel.

Since moisture tends to use up catalyst, it should also be excluded from the reaction zone insofar as is possible. In laboratory or small scale equipment, all of these substances conveniently may be removed by bringing the polymerization charge to a boil and venting a small proportion of the charge (e.g., about 10 percent) prior to introducing the catalyst to the reactor and effecting polymerization. In large scale production, however, charging of the reactor is preferably conducted under an inert atmosphere.

Laboratory scale polymerization reactions may conveniently be conducted in glass beverage bottles sealed with aluminum lined crown caps. The polymerization bottles should be carefully cleaned and dried before use. The catalyst employed may be added to the bottle by weight, or, where possible, the catalyst can be melted and added by volume. In some instances, it is desirable to add the catalyst as a suspension in the monomer or solvent. The monomer is added by volume, desirably employing sufficient excess so that about 10 percent of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil by placing the bottle on a heated sand bath. When approximately 10 percent of the charge has been vented, the bottle is rapidly sealed. Such a procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a constant temperature bath, or otherwise heated or cooled, until the polymerization reaction is complete. Ordinarily, the static system which requires a considerably longer reaction, may in some instances be attractive where higher molecular weights are desired. After the induction period, the charge goes through a period of thickening and finally becomes solid. At the end of the polymerization reaction, when properly conducted, all of the monomer has been consumed and there is a partial vacuum in the free space of the reaction vessel. After the polymerization has been completed, and the bottle cooled to handling temperature, the polymer may be removed by cutting the bottle open.

Small and large scale polymerizations can also be run in stainless steel stirred reactors.

Corresponding techniques are employed in large scale polymerization processes. Usually the reaction will be carried out in a closed autoclave provided with a heat transfer jacket and rotary agitator. Avoidance of air contamination is most easily secured by evacuating the vessel prior to charging the monomer and solvent and employing an inert atmosphere. To insure the purity of the monomer and solvent, a silica gel or other suitable adsorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature.

In referring herein to "monomer composition" it is intended to mean the monomer portion of the polymerization solution, that is, the conjugated diene plus any comonomer that may be present.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

A series of polymerizations are conducted in 28 ounce sealed bottles as described above using the catalyst (nBuNa/bicyclohexyl-18-crown-16) charges indicated below. The polymerization is conducted at 30° C. for 32 hours with the monomer added as 23 percent solution in hexane, the crown ether as a 0.052 mole/liter solution in hexane, and the nBuNa as a 0.66 mole/liter solution in

| Exp. Ident. | Gms. of BD | mMoles Crown Ether | mMoles nBuNa | mM Ratio nBuNa/ Ether | mM nBuNa/ 100 Gms. Mon. | % Conv. | DSV |
|---|---|---|---|---|---|---|---|
| A | 60.3 | 0.204 | 1.65 | 8/1 | 2.74 | 76.3 | 2.89 |
| B | 58.9 | 0.260 | 1.65 | 6.35/1 | 2.80 | 91.7 | 3.72 |
| C | 60.3 | 0.31 | 1.65 | 5.3/1 | 2.74 | 94.5 | 5.20 |
| D | 54.3 | 0.36 | 1.65 | 4.6/1 | 3.04 | 33.7 | 3.77 |

As shown by the dilute solution viscosities the molecular weights are in the range of 200,000 – 500,000 which are much higher than obtained when n-BuNa is used alone as the catalyst. Moreover the polymers when used in standard tire recipes show very good processibility and good wearability and wet traction when tested in tire compositions.

EXAMPLE II

The procedure of Example I is repeated a number of times to produce polymers similar to those of Example I using tricyclohexyl-18-crown-6 as the crown ether. The polymerizations are conducted for 3 days at 30°C. using the following proportions

| Exp. Ident. | Gms. of BD | mMoles Crown Ether | mMoles nBuNa | mM Ratio nBuNa/ Ether | mM nBuNa/ 100 Gms. Mon. | % Conv. |
|---|---|---|---|---|---|---|
| A | 36.8 | 0.146 | 2.48 | 17/1 | 6.74 | — |
| B | 37.0 | 0.366 | 3.30 | 9/1 | 8.92 | 41 |
| C | 37.4 | 1.168 | 4.95 | 4.2/1 | 13.23 | 60.4 |

The polymers have good processibility and have good properties similar to those of Example I.

EXAMPLE III

The procedure of Example I is repeated using isoprene as the monomer (in a 17 percent solution with hexane) and using tricyclohexyl-18-crown-6 as the crown ether.

| Exp. Ident. | Gms. of Isoprene | mM Crown Ether | mM nBuNa | mM Ratio nBuNa/ Ether | mM nBuNa/ 100 Gms. Monomer |
|---|---|---|---|---|---|
| A | 47.3 | 0.059 | 1.65 | 28/1 | 3.49 |
| B | 48.5 | 0.146 | 1.65 | 11.3/1 | 3.40 |
| C | 44.4 | 0.293 | 3.30 | 11.25/1 | 7.43 |
| D | 48.6 | 0.585 | 3.30 | 5.64/1 | 6.77 |

An analysis of the polymer from Exp. B shows 56.5 percent 3,4; 23 percent 1,4-trans; 11.8 percent cis and 8.7 percent 1,2 configuration. The molecular weights are in the same range as for Example I and the polymers have good processibility as well as wearability and wet traction in tire compositions.

EXAMPLE IV

The procedure of Example I is repeated a number of times using the same crown ether and conditions of Example I with the proportions and conditions shown below.

| Exp. Ident. | Gms. of BD | mM Crown Ether | mM nBuNa | mM Ratio nBuNa/ Ether | mM nBuNa/ 100 Gms. Monomer | DSV |
|---|---|---|---|---|---|---|
| A | 62 | — | 2.25 | — | 3.63 | 0.9 |
| B | 62 | 0.125 | 2.25 | 18 | 3.63 | 1.68 |
| C | 62 | 0.25 | 2.25 | 9.2 | 3.63 | 2.55 |
| D | 62 | 0.50 | 6.75 | 13.5 | 10.89 | 3.64 |
| E | 62 | 0.75 | 13.50 | 18 | 21.78 | 4.87 |

The polymers have properties similar to those of Example I. The conversion in Run A is only about 45 percent whereas in Runs B–E it is 70–90 percent.

EXAMPLE V

The procedure of Example I is repeated a number of times using a mixture of butadiene and styrene, tricyclohexyl-18-crown-6 and the proportions shown below.

| Exp. Ident. | Gms. of BD | Gms. of Styrene | mM Crown Ether | mM nBuNa | mM Ratio nBuNa/ Ether | mM nBuNa/ 100 Gms. Mon. |
|---|---|---|---|---|---|---|
| A | 59.8 | 9 | 0.06 | 1.65 | 27.5/1 | 2.40 |
| B | 56.8 | 9 | 0.146 | 1.65 | 11.3/1 | 2.50 |
| C | 61.6 | 9 | 0.292 | 3.30 | 11.3/1 | 4.67 |
| D | 58.2 | 9 | 0.584 | 1.65 | 2.8/1 | 2.46 |

The polymers have properties similar to those of Example I.

EXAMPLE VI

The procedure of Example I is repeated a number of times using a variety of temperatures with an 80/20 mixture of butadiene and styrene (in hexane) and tricyclohexyl-18-crown-6 (with nBuNa) as reported below:

| Exp. Ident. | Gms. of BD/ Styrene | mM Crown Ether | mM nBuNa | mM Ratio nBuNa/ Ether | mM nBuNa/ 100 Gms. Monomer | Temp. °C |
|---|---|---|---|---|---|---|
| A | 62 | 0.117 | 2.97 | 25.4/1 | 4.79 | 5 |
| B | do. | 0.146 | 3.30 | 22.6/1 | 5.32 | 5 |
| C | do. | 0.117 | 2.97 | 25.4/1 | 4.79 | 30 |
| D | do. | 0.146 | 1.65 | 10.6/1 | 2.66 | 30 |
| E | do. | 0.117 | 2.97 | 25.4/1 | 4.79 | 50 |
| F | do. | 0.146 | 3.30 | 22.6/1 | 5.32 | 50 |
| G | do. | 0.117 | 1.32 | 11.3/1 | 2.13 | 80 |
| H | do. | 0.146 | 1.65 | 10.6/1 | 2.66 | 80 |

The polymers have properties similar to those of Example I.

EXAMPLE VII

The procedure of Example I is repeated a number of times using an 80/20 mixture of butadiene and styrene as a 20 percent solution in hexane. The crown ether is tricyclohexyl-18-crown-6 and the temperature is 30°C. with the proportions as reported below:

| Exp. Ident. | Gms. of BD/ Styrene | mM Crown Ether | mM nBuNa | mM Ratio nBuNa/ Ether | mM nBuNa/ 100 Gms. Monomer |
|---|---|---|---|---|---|
| A | 50.8 | 0.117 | 1.65 | 14.1/1 | 3.25 |
| B | 49.8 | 0.117 | 1.98 | 17/1 | 3.98 |
| C | 50.8 | 0.117 | 2.31 | 20/1 | 4.57 |
| D | 50.8 | 0.117 | 2.64 | 22.6/1 | 5.20 |

The polymers have properties similar to those of the polymers of Example I.

EXAMPLE VIII

The procedure of Example I is repeated except that a 2-gallon stainless steel-lined reactor is used equipped with stirrer, temperature control and recording means and inlet and outlet. To this reactor there is introduced a 23 percent butadiene in hexane solution containing 981 gms. of butadiene. Also added are 145 gms. of styrene, 2.34 millimoles of tricyclohexyl-18-crown-6 and 26.4 millimoles of nBuNa. The reaction mixture is stirred and maintained at 86° F. (30° C.) for a prolonged period with samples removed periodically for determination of percent of conversion. At the end of 25 hours, there is 32.4 percent conversion; after 49 hours, there is 43.4 percent conversion; and at 113 hours, there is 51 percent conversion. The reagents used represent a nBuNa/crown ether ratio of 11.28/1 and 2.34 millimoles of nBuNa per 100 grams of monomer. The polymer has properties similar to those of the polymers of Example I.

EXAMPLE IX

The procedure of Example VIII is repeated, omitting the styrene and using 1148 gms. of butadiene, 2.41 millimoles of tricyclohexyl-18-crown-6, 27.2 millimoles of nBuNa and a reaction period of 2 days. These amounts represent a nBuNa/crown ether ratio of 11.28/1, and 2.37 millimoles of nBuNa per 100 gms. of monomer. The product has a Mooney viscosity of 83 (ML/4) and other properties similar to those of the polymers of Example I.

EXAMPLE X

The procedure of Example VIII is repeated, using a mixture of 843.8 gms. of butadiene and 233.9 grams of isoprene in approximately 21 percent hexane solution, 2.41 millimoles of tricyclohexyl-18-crown-6 and 27.19 millimoles of nBuNa. These amounts represent a nBuNa/crown ether ratio of 11.28/1, and 2.58 millimoles of nBuNa per 100 gms. of monomer. The polymerization is conducted for 43 hours and gives a 50 percent yield of a copolymer having a dilute solution viscosity of 2.04.

EXAMPLE XI

The procedure of Example I is repeated a number of times using n-amyl Na and dibenzo-14-crown-4 as the catalyst combination at 30° C. for 48 hours.

| Exp. Ident. | Gms. of BD | mM Crown Ether | mM n-Amyl Na | mM Ratio n-AmylNa /Ether | mM AmylNa/ 100 gms. Monomer | DSV |
| --- | --- | --- | --- | --- | --- | --- |
| A | 60.1 | 0.21 | 1.62 | 7.7/1 | 2.7 | 2.64 |
| B | 59.2 | 0.25 | 1.62 | 6.48/1 | 2.8 | 3.25 |
| C | 60.2 | 0.32 | 1.62 | 5/1 | 2.7 | 4.86 |

The polymers are similar in properties to those of Example I.

EXAMPLE XII

The procedure of Example I is repeated a number of times using 2-ethylhexyl Na and dibenzo-21-crown-7 as the catalyst combination at 30° C. for 50 hours.

| Exp. Ident. | Gms. of BD | mM Crown Ether | mM 2-Ethyl- Hexyl Na | mM Ratio Na/ Ether | mM/Na 100 gms. Monomer | DSV |
| --- | --- | --- | --- | --- | --- | --- |
| A | 58.9 | 0.23 | 1.67 | 7.26/1 | 2.84 | 2.45 |
| B | 60.2 | 0.26 | 1.67 | 6.42/1 | 2.77 | 3.18 |
| C | 59.6 | 0.34 | 1.67 | 4.9/1 | 2.8 | 4.74 |

EXAMPLE XIII

The procedure of Example I is repeated a number of times using n-Butyl K and tribenzo-18-crown-6 as the catalyst combination for 52 hours at 30° C.

| Exp. Ident. | Gms. of BD | mM Crown Ether | mM n-BuK | mM Ratio n-BuK/ Ether | mM n-BuK 100 gms. Monomer | DSV |
| --- | --- | --- | --- | --- | --- | --- |
| A | 60.1 | 0.23 | 1.66 | 7.2/1 | 2.76 | 2.52 |
| B | 60.3 | 0.26 | 1.66 | 6.4/1 | 2.75 | 3.24 |
| C | 59.6 | 0.33 | 1.66 | 5/1 | 2.78 | 4.94 |

The polymers have properties similar to those of Example I.

EXAMPLE XIV

The procedure of Example I is repeated a number of times using isohexyl K and dibenzo-14-crown-4 as the catalyst combination for 72 hours at 30° C.

| Exp. Ident. | Gms. of BD | mM Crown Ether | mM Iso- hexyl K | mM Ratio HexylK/ Ether | mM Hexyl K/ 100 Gms. Monomer | DSV |
| --- | --- | --- | --- | --- | --- | --- |
| A | 58.9 | 0.21 | 1.68 | 8/1 | 2.85 | 2.39 |
| B | 59.6 | 0.24 | 1.68 | 7/1 | 2.80 | 3.34 |
| C | 60.3 | 0.35 | 1.68 | 4.8/1 | 2.79 | 5.02 |

EXAMPLE XV

The procedure of Example I is repeated a number of times using t-amyl K and tribenzo-18-crown-6 as the catalyst combination for 64 hours at 30° C.

| Exp. Ident. | Gms. of BD | mM Crown Ether | mM t-Amyl K | mM Ratio t-Amk/ Ether | mM t-Am K/ 100 Gms. Monomer | DSV |
| --- | --- | --- | --- | --- | --- | --- |
| A | 60.2 | 0.24 | 1.66 | 7/1 | 2.76 | 2.18 |
| B | 60.4 | 0.27 | 1.66 | 6/1 | 2.75 | 3.76 |
| C | 58.9 | 0.36 | 1.66 | 4.6/1 | 2.82 | 5.12 |

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for the hydrocarbon solution polymerization of a monomer composition containing at least 70 percent conjugated diene comprising the step of maintaining said monomer composition at a temperature of −50° to 150°C in intimate contact with a catalyst composition consisting essentially of:
   a. a sodium or potassium alkyl having 1–10 carbon atoms; and
   b. a crown ether consisting essentially of a heterocyclic structure of at least 3 oxygen atoms and aliphatic or aromatic hydrocarbon radicals, adjacent oxygen atoms in said heterocyclic structure being separated from and joined to each other by at least two carbon atoms of said hydrocarbon radicals and, where cycloaliphatic or aromatic rings are present, oxygen atoms in said heterocyclic structure are attached to adjacent carbon atoms in said rings;

the concentration of said catalyst composition being 1–10 millimoles of sodium or potassium alkyl per 100 grams of said monomer composition, said crown ether being present in said catalyst composition in a ratio of 0.01–1.0 mole per mole of sodium or potassium alkyl, said polymerization being conducted for a period of at least 2 hours.

2. The process of claim 1 in which the heterocyclic structure in said crown ether has at least 4 oxygen atoms and at least 8 carbon atoms therein.

3. The process of claim 2 in which said temperature is 50°–80° C.

4. The process of claim 3 in which said conjugated diene is essentially all 1,3-butadiene.

5. The process of claim 3 in which said conjugated diene is 1,3-butadiene.

6. The process of claim 5 in which said polymerization is conducted for at least 6 hours.

7. The process of claim 6 in which said alkyl is a sodium alkyl, said catalyst composition contains 2–7 millimoles of sodium alkyl per 100 grams of monomer and 0.015–0.5 millimoles of crown ether per millimole of sodium alkyl.

8. The process of claim 7 in which said crown ether is bicyclohexyl-18-crown-6.

9. The process of claim 7 in which said crown ether is tricyclohexyl-18-crown-6.

10. The process of claim 7 in which said crown ether is dibenzo-14-crown-6.

11. The process of claim 7 in which said crown ether is dibenzo-18-crown-6.

12. The process of claim 7 in which said crown ether is tribenzo-18-crown-6.

13. The process of claim 7 in which said sodium alkyl is $n$-butyl sodium.

14. The process of claim 7 in which said sodium alkyl is $n$-butyl sodium.

15. The process of claim 14 in which said hydrocarbon solution is hexane.

16. The process of claim 1 in which said alkyl is $n$-butyl sodium.

17. The process of claim 1 in which said hydrocarbon solution is hexane.

* * * * *